United States Patent
Nguyen et al.

(10) Patent No.: US 7,012,392 B2
(45) Date of Patent: Mar. 14, 2006

(54) MULTI-STAGE DYNAMIC BRAKING RESISTOR NETWORK

(75) Inventors: That Nguyen, Mississauga (CA); Qihua Zhao, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 61 days.

(21) Appl. No.: 10/774,288

(22) Filed: Feb. 6, 2004

(65) Prior Publication Data

US 2005/0174081 A1 Aug. 11, 2005

(51) Int. Cl.
*H02P 3/14* (2006.01)
*H02P 3/22* (2006.01)

(52) U.S. Cl. .................. 318/376; 318/371; 318/375; 702/132

(58) Field of Classification Search ........ 318/370–379, 318/139, 269, 798, 801; 105/35; 702/132
See application file for complete search history.

(56) References Cited

U.S. PATENT DOCUMENTS

| | | | |
|---|---|---|---|
| 3,630,304 A | 12/1971 | Sahinkaya | |
| 3,812,411 A | 5/1974 | Johnson et al. | |
| 3,890,551 A | 6/1975 | Plunkett | |
| 3,930,191 A | 12/1975 | Loderer | |
| 4,035,692 A * | 7/1977 | Luy et al. .................. | 361/103 |
| 4,093,900 A * | 6/1978 | Plunkett .................... | 318/370 |
| 4,096,423 A | 6/1978 | Bailey et al. | |
| 4,145,641 A * | 3/1979 | Ozaki ........................ | 318/269 |
| 4,174,732 A | 11/1979 | Anderson | |
| 4,216,417 A | 8/1980 | Anderson et al. | |
| 4,284,930 A * | 8/1981 | Matty ........................ | 318/269 |
| 4,426,606 A * | 1/1984 | Suita et al. ................ | 318/375 |
| 4,458,185 A * | 7/1984 | Matty et al. ............... | 318/270 |
| 4,761,600 A | 8/1988 | D'Atre et al. | |
| 5,198,745 A | 3/1993 | Larsen et al. | |
| 5,280,223 A * | 1/1994 | Grabowski et al. ........ | 318/139 |
| 5,283,507 A | 2/1994 | Stitt et al. | |
| 5,311,106 A | 5/1994 | Hazen | |
| 5,323,095 A * | 6/1994 | Kumar ....................... | 318/376 |
| 5,327,055 A * | 7/1994 | Danielson et al. ......... | 318/366 |
| 5,373,219 A * | 12/1994 | Grabowski et al. ........ | 318/139 |
| 5,394,069 A * | 2/1995 | Danielson et al. ......... | 318/371 |
| 5,396,214 A * | 3/1995 | Kumar ....................... | 338/279 |
| 5,432,413 A * | 7/1995 | Duke et al. ................ | 318/139 |
| 5,659,233 A | 8/1997 | Nashiki | |
| 5,814,954 A | 9/1998 | Suzuki et al. | |
| 5,847,533 A * | 12/1998 | Hakala et al. .............. | 318/798 |

(Continued)

FOREIGN PATENT DOCUMENTS

EP 393814 A1 * 10/1990

(Continued)

*Primary Examiner*—Paul Ip
(74) *Attorney, Agent, or Firm*—Birch, Stewart, Kolasch & Birch, LLP

(57) ABSTRACT

A multi-stage dynamic braking resistor network (23) is provided that includes a plurality of dynamic brake resistors (1*a–d*) for dissipating, as heat, regenerative energy inputted onto a system bus (17) by a motor or actuator (19), and a plurality of switches (31*a–d*) for connecting the dynamic brake resistors (1*a–d*) to and from the system bus (17), respectively. The multi-stage dynamic braking resistor network (23) further includes a control circuit (25) for controlling the switches (31*a–d*) such that the dynamic brake resistors (1*a–d*) are connected to and from the system bus (17) on the basis of a predetermined voltage threshold of the system bus and on the basis of a predetermined rotation pattern.

17 Claims, 8 Drawing Sheets

U.S. PATENT DOCUMENTS

| | | | |
|---|---|---|---|
| 6,081,086 A * | 6/2000 | Roth-Stielow et al. | 318/375 |
| 6,094,024 A * | 7/2000 | Westlake | 318/375 |
| 6,175,204 B1 | 1/2001 | Calamatas | |
| 6,829,556 B1 * | 12/2004 | Kumar | 702/132 |
| 2004/0160208 A1 * | 8/2004 | Youm et al. | 318/801 |
| 2004/0160792 A1 * | 8/2004 | Youm et al. | 363/37 |
| 2004/0162696 A1 * | 8/2004 | Kumar | 702/132 |
| 2004/0238243 A1 * | 12/2004 | King et al. | 180/65.2 |
| 2005/0001635 A1 * | 1/2005 | Kojima | 324/713 |
| 2005/0005814 A1 * | 1/2005 | Kumar et al. | 105/35 |

FOREIGN PATENT DOCUMENTS

JP          63161886 A *   7/1988

* cited by examiner

MULTI-STAGE DYNAMIC BRAKING RESISTOR NETWORK

BACKGROUND OF THE INVENTION

1. Field of the Invention

The present invention relates to a multi-stage dynamic braking resistor network and associated control circuitry for absorbing and dissipating energy that is put onto a system bus and a method thereof.

2. Description of the Background Art

Conventional braking impedances, which are typically referred to as braking resistors, have been applied to power systems, for example, remote generation locations. The braking resistor provides a shunt resistance path to ground when coupled with the power system via a switch.

FIG. 1 is a perspective view of an example of a conventional dynamic brake resistor 2. The dynamic brake resistor 2 can be an assembly of grid elements, for example. Each assembly comprises a first stack 3 and a second stack 5, with each stack having an upper layer 7, 9 and a lower layer 11, 13. Each layer is formed, for example, from a plurality of stamped metal sheet units having a serpentine configuration, which are welded at their ends to adjacent units to form a series resistance element.

Typically, braking resistors increase a load on a system bus, whereby an increased load on the system bus will absorb the excessive energy generated by a rotary actuator or an electric motor. In other words, during a regeneration mode of operation, a motor acts as a generator to supply power to the system. For instance, when driving power is disconnected from a motor or actuator, the motor or actuator continues to rotate and thereby regenerated energy is placed onto the system bus. In some systems, this regenerated energy is returned to the power source. When the power source is not receptive to such regenerative energy, an overvoltage will occur and possible damage could happen to the system. To prevent such overvoltage, a dynamic brake resistor can be used to absorb/dissipate the regenerated power by converting the regenerated power to thermal energy, e.g., heat.

Some braking resistors have a mechanical switch that couples the resistor to the power system for a predetermined time following a detection of a system disturbance. These mechanical switching braking resistors, however, are abruptly removed from the system bus by opening the mechanical switch. After removal from the system bus, these conventional braking resistors cannot be switched back into the system bus until they have cooled down sufficiently.

In existing systems, a large resistor is simply switched into conductance with the power system for a predetermined time based upon some discrete event upon the system bus. A single large resistor, however, lacks flexibility and imposes an additional burden on the power system during the time it is coupled therewith if less than the total dissipation is required to respond to the disturbance. Another drawback of using a single resistor is the voltage ripple generated by switching the resistor on or off. Since the resistor should be rated so as to absorb the excessive energy for a worst case scenario, when the resistor is switched on, the system bus voltage will drop significantly, and when it is switched off, the voltage will kick back causing voltage overshoot on the system bus. This voltage fluctuation will impact the power quality and cause EMI (Electro-Magnetic Interference) problems in the system.

Furthermore, a single large resistor has a greater weight than using several dynamic brake resistors in order to dissipate a similar amount of energy from the system bus. This is particular relevant in, for example, an aircraft, where weight reduction is a primary objective. Moreover, a FCAS (Flight Control Actuator System) system must be able to deal with simultaneous regeneration of all FCAS systems or repetitive high voltage transient on aircraft electric power systems.

U.S. Pat. No. 5,396,214 discloses a dynamic braking grid resistor configuration for reducing EMI (Electro Magnetic Impulses) generated by electrical braking of an electric motor. This dynamic braking grid resistor configuration, however, does not provide any means for selectively switching the resistor configuration depending on specific system requirements.

SUMMARY OF THE INVENTION

It is therefore an object of the present invention to provide a multi-stage dynamic braking resistor network that dissipates excessive energy placed on a system bus through regenerative braking and a method thereof.

A multi-stage dynamic braking resistor network, according to one implementation, includes four dynamic brake resistors for dissipating, as heat, regenerative energy inputted onto a system bus by a motor or actuator, and four switches for connecting the dynamic brake resistors to and from the system bus. The multi-stage dynamic braking resistor network further includes a control circuit for controlling the switches such that the dynamic brake resistors are connected to and from the system bus based on predetermined voltage thresholds of the system bus and the thermal conditions of the dynamic brake resistors. The switches can also be controlled on the basis of a turn-on rate and a turn-off rate of the dynamic brake resistors.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
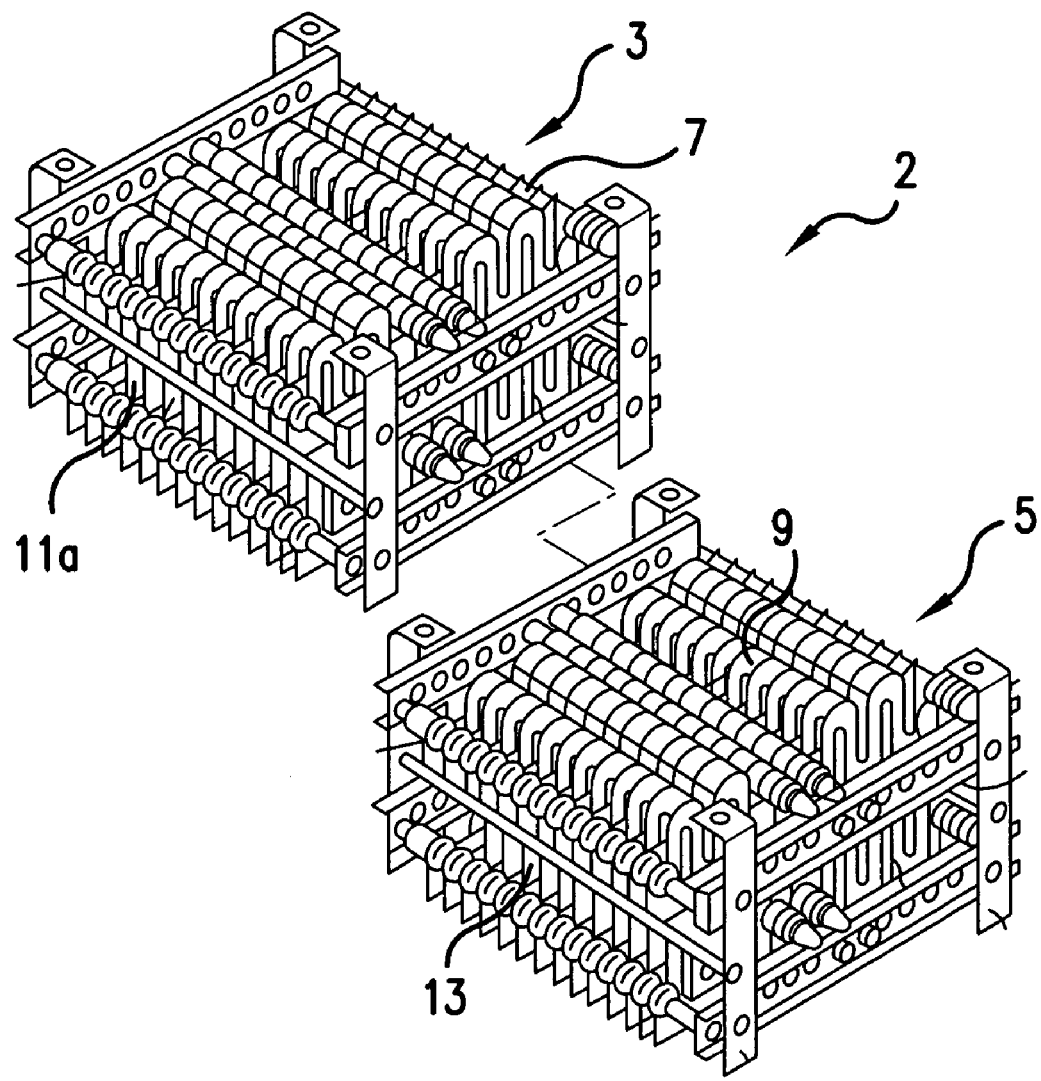
FIG. 1 is a perspective view of a conventional dynamic brake resistor.
Figure 2:
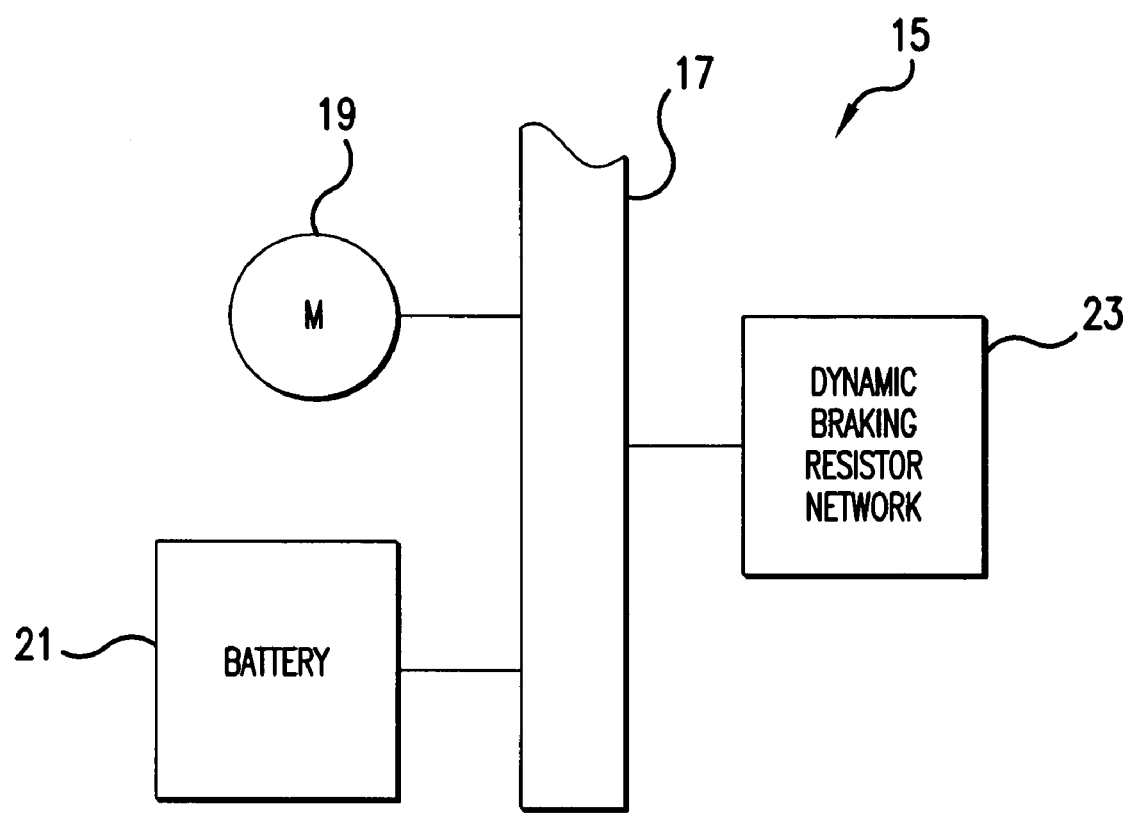
FIG. 2 is a simplified block diagram of a preferred embodiment of the present invention.

FIG. 2 is a block diagram showing a portion of a FCAS system 15. Although only one FCAS system 15 is shown, several FCAS systems can be connected to one another in, for example, an airplane, which may have eight FCAS systems. The FCAS system 15, shown in FIG. 2 includes, for example, a system bus 17, one or more motors or actuators 19, a battery 21, and a dynamic braking resistor network 23. Although it is not shown in FIG. 2, the dynamic braking resistor network 23 can include one or more dynamic brake resistors 1, which is discussed further below.

The dynamic braking resistor network 23 must be able to deal with a worst-case scenario of an FCAS system 15. A worst-case scenario is, for example, a simultaneous regeneration of all FCAS systems on one system bus 17. In other words, the dynamic braking resistor network 23 dissipates this regenerative energy, which is produced by the motors or actuators 19, without disturbing the battery voltage and maintains the battery voltage within power quality limits. Depending on the amount of energy regenerated, a plurality of dynamic braking resistors 1 are utilized based on a ramping concept, which is described in further detail below. Although the following description provides, as an example, four dynamic breaking resistors, it should be appreciated that any number of dynamic breaking resistors can be applied.

During the motoring mode of operation, the motors 19 will rotate at a speed that depends on both the magnitude of excitation current in their fields and the magnitude of the voltage applied to their respective windings. When the motors or actuators 19 are no longer energized, they continue to rotate and thereby regenerate energy onto the system bus 17 and therewith the voltage at the source, namely the battery 21, is increased. If there is no braking resistor present in the system the voltage on the system bus 17 will increase, and this can lead to, for example, damages to the components on the system bus 17.

Figure 3:
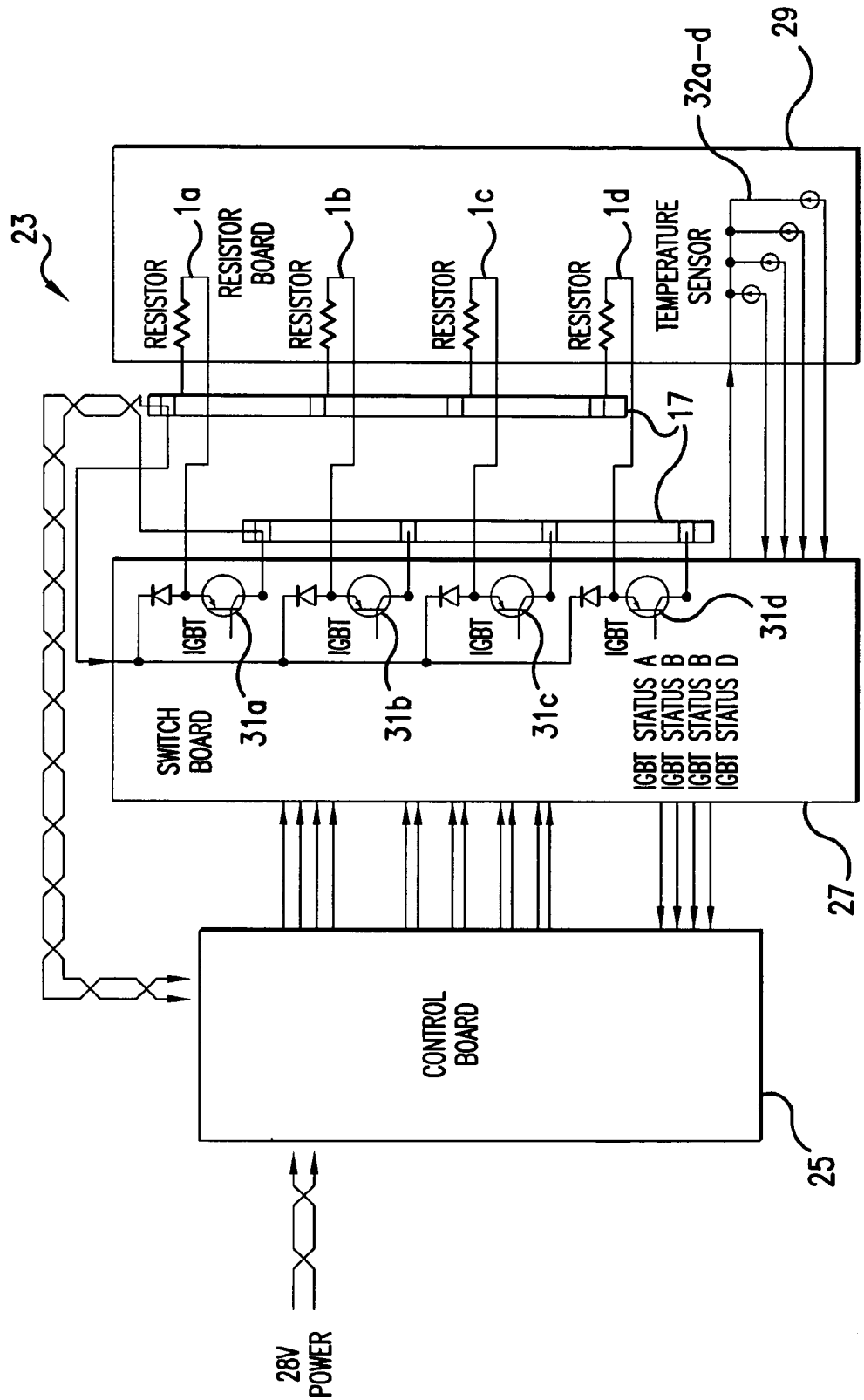
FIG. 3 is an interconnection block diagram of a dynamic brake resistor network according to a preferred embodiment of the present invention.

FIG. 3 is an interconnection block diagram of the dynamic braking resistor network 23 according to one implementation of the present invention. The dynamic braking resistor network 23 includes a control board 25, a switch board 27, and a resistor board 29, which are all electrically connected to the system bus 17. The control board 25 is described further below with reference to FIG. 4.

The switch board 27 includes switches 31a–d, which receive a control signal from the control board 25, in order to switch each of the dynamic brake resistors 1a–d on and off of the system bus 17. In other words, switch 31a controls the dynamic brake resistor 1a, switch 31b controls the dynamic brake resistor 1b, switch 31c controls the dynamic brake resistor 1c, and switch 31d controls the dynamic brake resistor 1d. An additional benefit of each switch 31a–d switching each dynamic brake resistor 1a–d independently is that a certain amount of redundancy can be obtained. In the event that one of the switches 31a–d or an electrical branch (not shown) fails, the other switches are capable of switching their respective dynamic brake resistors, although the overall system exhibits a reduced ampacity therewith.

The switches 31a–d should preferably be rated to conduct the current in a continuous fashion and should preferably be rated for at least 500V. The switches 31a–d can be formed of semiconductor switches such as IGBT switches or Power MOSFETS.

The resistor board 29 includes the dynamic brake resistors 1a–d and also includes temperature sensors 33a–d. The temperature sensors 33a–d monitor the temperature of their respective dynamic brake resistors 1a–d and provide a temperature signal to the switch board 27. These temperature signals that are received by the switch board 27 are utilized to turn OFF the control circuit of the affected Braking Resistor Leg.

Figure 4:
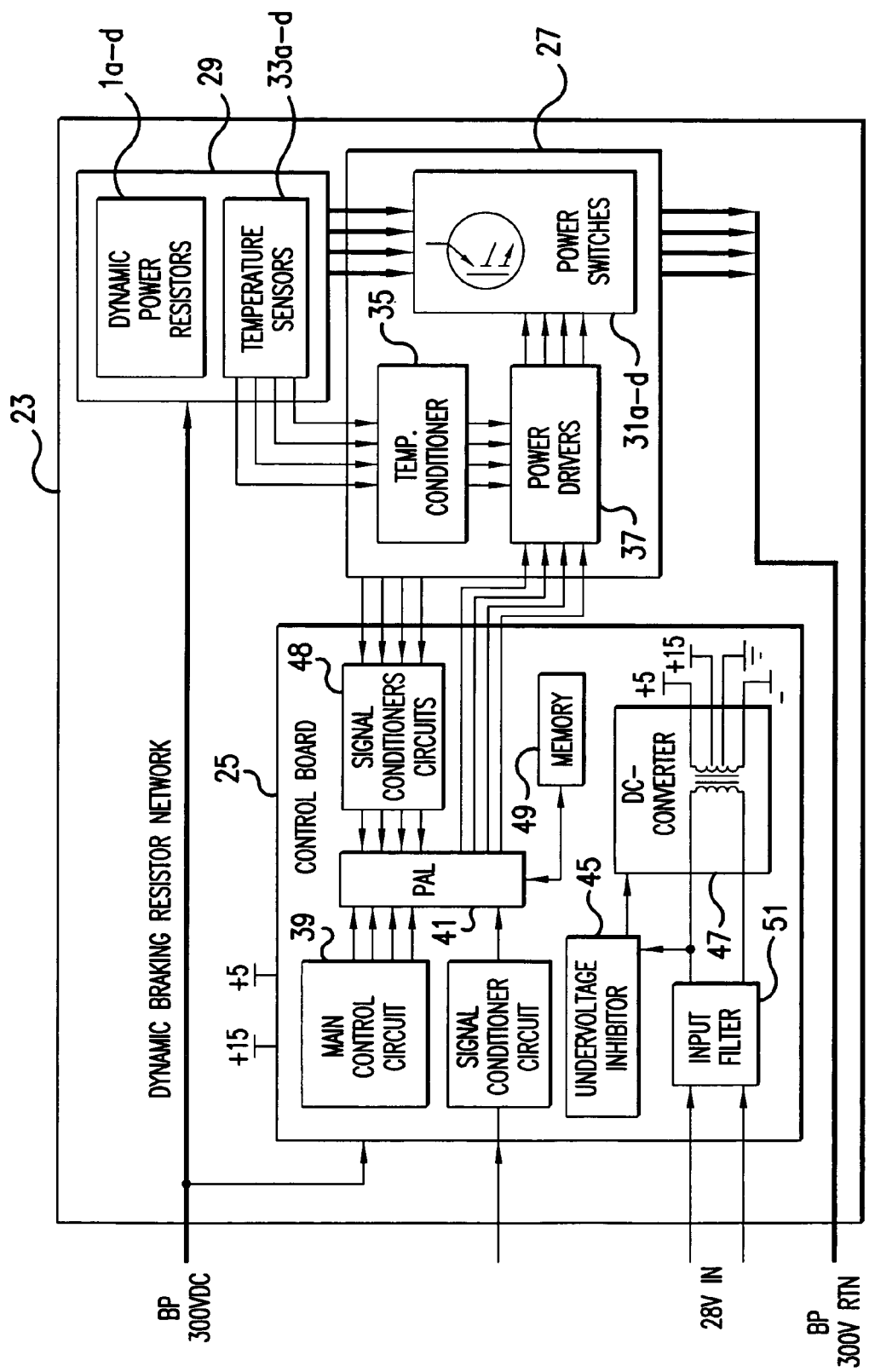
FIG. 4 is a functional block diagram of the dynamic brake resistor network of FIG. 3.

Referring to FIG. 4, which is a functional block diagram of the dynamic braking resistor network 23 of FIG. 3, there is shown the control board 25, the switch board 27, and the resistor board 29.

The switch board 27 further includes a temperature conditioner circuit 35, which receives temperature signals from the temperature sensors 33a–d, and power drivers 37. The temperature conditioner circuit 35 is used to set the overtemp trip point when the dynamic brake resistors 1a–d exceed a predetermined threshold, e.g., a required temperature limit.

The control board 25 includes a main control circuit 39, which comprises level window detectors (not further shown) having a controlled ON/OFF time delay, which set the ramping levels. The level window detectors measure the bus voltage and compares the voltage with predetermined thresholds in order to determine the number of dynamic brake resistors 1–d that are to be activated, thereby preventing overstress on power and system components.

The main control circuit 39 provides control signals to the PAL (Programmable Array Logic) 41, which is used for a dynamic brake resistor load rotation. Each control signal is fed to the PAL 41, which then performs load rotation. This is accomplished by turning on each dynamic brake resistor sequentially as the bus voltage continues to rise, i.e., if the bus voltage stops rising after activating two of the four dynamic brake resistors, the inactive two dynamic brake resistors will not be activated concurrently with the active dynamic brake resistors unless the system bus voltage begins climbing again. This would allow the dynamic brake resistor network to switch to a more suitable load level to absorb the available regenerative energy.

The order of activation would be rotated throughout the dynamic brake resistors (DBR) to relieve the stress on the power components, according to, for example, the following table:

| DBR LEG | Activation Sequence #1 | Activation Sequence #2 | Activation Sequence #3 | Activation Sequence #4 |
| --- | --- | --- | --- | --- |
| DBR A | 1 | 4 | 3 | 2 |
| DBR B | 2 | 1 | 4 | 3 |
| DBR C | 3 | 2 | 1 | 4 |
| DBR D | 4 | 3 | 2 | 1 |

If two resistors are activated, the rotation sequence is, for example, AB, BC, DC, DA, AB, etc. Similarly, if three resistors are activated, the rotation sequence is, for example, ABC, BCD, CDA, DAB, ABC, etc. If, in the extreme case, e.g., a worst case scenario, all four resistors are activated, there will not be a rotation. The system, however, should be designed for this worst case scenario such that all four resistors are required to be activated.

The PAL 41 also receives signals from the signal conditioner circuits 43 in order to determine the battery contactor status, and outputs control signals to the power drivers 37 in order to switch the power switches 27 such that the dynamic brake resistors 1–d are selectively switched on and from the system bus 17. The PAL 41 is also connected to a memory 49, which is able to store data regarding a rotation pattern of the dynamic brake resistors 1–d and data regarding rotation patterns that have been performed. Although FIG. 4 shows that the memory 49 is connected to the PAL 41, it should be appreciated that the memory 49 can be connected directly with the main control circuit 39.

Figure 5:
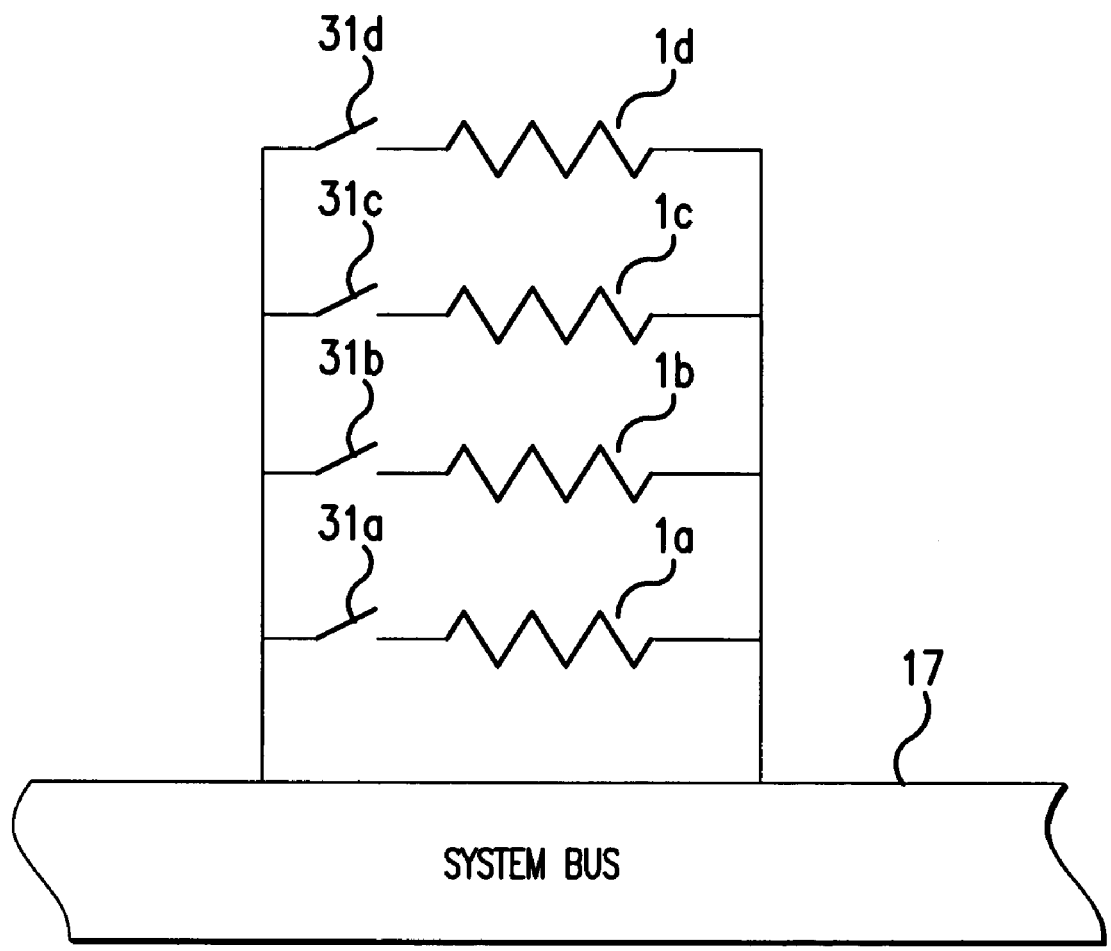
FIG. 5 is a schematic illustration of the dynamic brake resistors being arranged in parallel, according to an embodiment of the present invention.

According to a preferred embodiment of the present invention, the dynamic brake resistors 1–d are arranged in parallel, as shown in FIG. 5. Referring to FIG. 5, it can be seen that the dynamic brake resistors 1–d, and their respective switches 31–d, are arranged in parallel in order to individually or collectively dissipate regenerative energy from the system bus 17. Furthermore, as explained in detail below, each of the dynamic brake resistors 1a–1d can be selectively switched on and from the system bus 17 based on the amount of regenerative energy that has to be dissipated.

Alternatively, according to a further embodiment of the invention, the dynamic brake resistors 1–d can be arranged in series.

As stated above, when the motors or actuators 19 are no longer energized, they continue to rotate and thereby regenerate energy onto the system bus 17 and therewith the voltage at the source, namely the battery 21, is increased. In order to reduce this regenerative energy, the dynamic brake resistors 1–d are selectively switched on and from the system bus 17. Because there are a plurality of dynamic brake resistors in the dynamic braking resistor network, a fine tuning can be achieved by switching the desired number of resistors on and off on the basis of an amplitude of the regenerative energy put onto the system bus. Furthermore, in the dynamic braking resistor network, each dynamic brake resistor will absorb a smaller amount of energy than in the single dynamic brake resistor network of the conventional art, as such, the voltage fluctuation caused by switching the dynamic brake resistors on and off will be much smaller and hence the system power quality requirement can be met.

Figure 6:
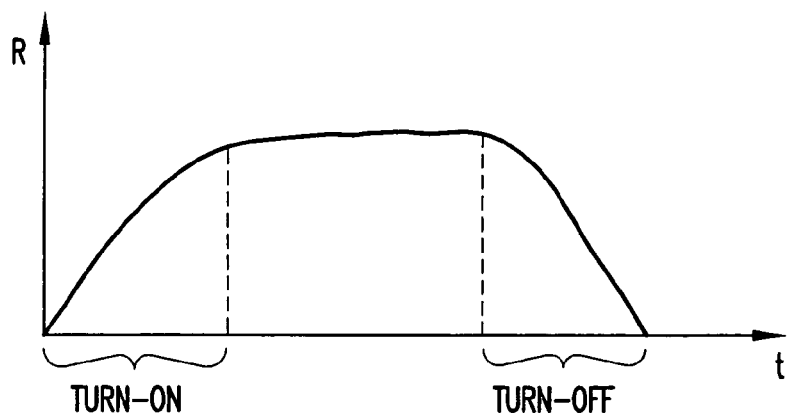
FIG. 6 is a graph representing the turn-on and turn-off of a dynamic brake resistor, in accordance with an embodiment of the present invention.

Each of the dynamic brake resistors 1–d exhibit a turn-on and turn-off period, in which time period, the dynamic brake resistors 1–d are not operating at full resistivety, as shown in FIG. 6. Referring to FIG. 6, there is shown an example of the turn-on and turn-off period for one of the dynamic brake resistors 1–d.

Figure 7:
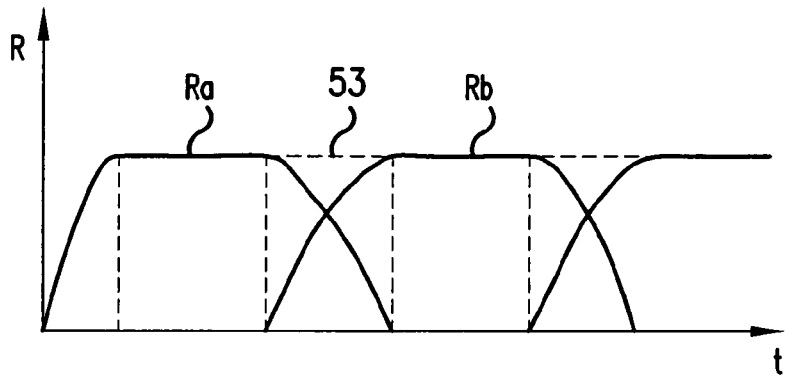
FIG. 7 is a graph depicting a rotation of the dynamic brake resistors, in accordance with an embodiment of the present invention.

FIG. 7 shows an example of a rotation from the dynamic brake resistor 1a to the dynamic brake resistor 1b, whose resistance is Ra and Rb, respectively. When the dynamic brake resistor 1a is turned off (disconnected from the system bus 17), it exhibits a turn-off rate and when the dynamic brake resistor 1b is turned on (connected to the system bus 17), it exhibits a turn-on rate. In other words, the resistances of the dynamic brake resistors 1a and 1b do not exhibit a maximum and minimum resistance instantaneously. Thus, in order to maintain a uniform resistance 53 between the turn-off and turn-on of the dynamic brake resistors 1a and 1b, respectively. Therefore, the energy on the bus does not fall below an undesirable level, e.g., sink, nor does the energy on the bus momentarily exceed a required limit, e.g., spike, during the rotation between the dynamic brake resistors 1a,b.

Figure 8:
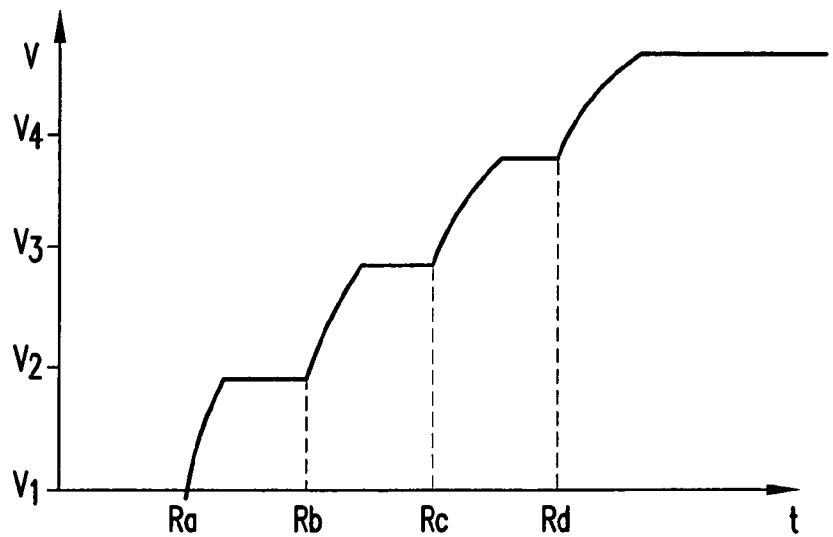
FIG. 8 is a graph depicting the collective connection of the dynamic brake resistors to a system bus, in accordance with an embodiment of the present invention.

When the regenerative energy placed onto the system bus 17 by the motors 19 exceeds the resistive capacity of one or more of the dynamic brake resistors 1, the dynamic brake resistors 1 can be selectively and collectively switched onto the system bus 17. For example, with reference to FIG. 8, the dynamic brake resistor 1a (whose resistance is represented as Ra) is connected to the system bus 17 when the regenerative energy on the system bus 17 exceeds a specific voltage, e.g., V1. If, while the dynamic brake resistor 1a is dissipating energy, additional amounts of regenerative energy is added onto the system bus 17 and exceeds a certain voltage threshold V2, the dynamic brake resistor 1b (whose resistance is represented as Rb) is concurrently switched onto the system bus 17. Similarly, if the total amount of regenerative energy exceeds the thresholds V3 and V4, for example, the dynamic brake resistors 1c and 1d (whose resistances are represented by Rc and Rd, respectively) are concurrently connected to the system bus 17. Thus, the total number of dynamic brake resistors that are utilized in the network is dependent on the total amount of regenerative energy that has to be dissipated during a worst-case scenario.

Figure 9:
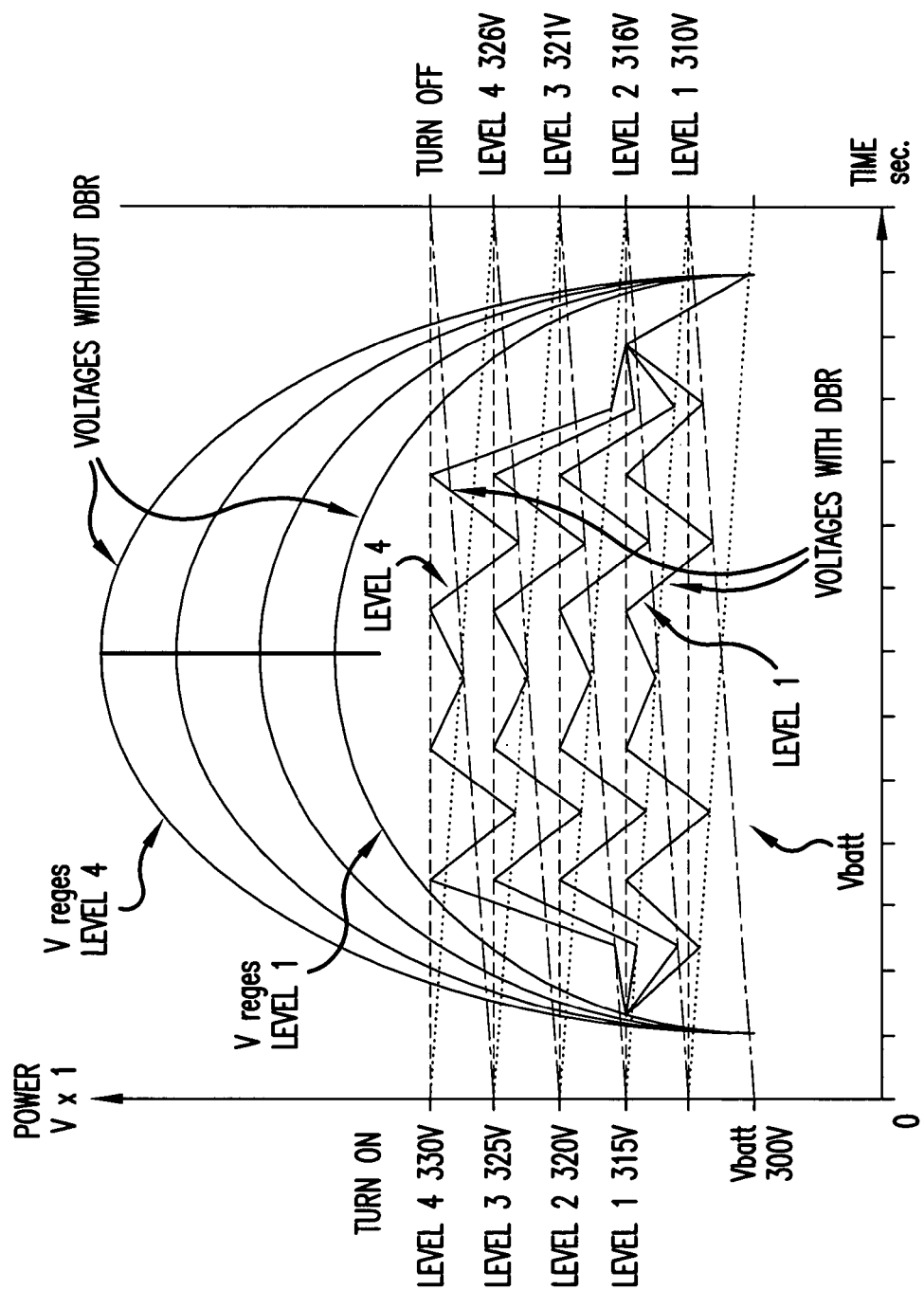
FIG. 9 is a graph of power versus time of a ramping concept according to a preferred embodiment of the present invention.

FIG. 9 shows a detailed graph of power versus time of the ramping concept at each level setting according to a preferred embodiment of the present invention. To create four ramp steps, four flip-flops (not shown) are utilized, for example, to control the turn-on and the turn-off of the power drivers 37. As can be seen from FIG. 9, the turn-off sequence has a time delay of 0.2 msec to set the rate of the ramping steps. Four turn-on and turn-off detection levels with a 5-volt window are the actual ripples of the system bus 17 voltage when the dynamic brake resistors 1–d are activated. The benefit of this ramping control is that at any moment, at least one of the dynamic brake resistors 1–d can be activated or de-activated. By adjusting the window detector levels, the voltage ripple on the system bus can be controlled to meet power input quality requirements.

A greater detailed description of the operation of the window detector levels is given in the following example, with reference to FIG. 9. Assuming that the dynamic braking resistor network 23 is installed in a 300VDC system that drives motor or actuators. The dynamic braking resistor network has four 7.5 ohm dynamic brake resistors and the system requires that the bus voltage be maintained below 350V. The first level is set from 315V down to 310V and will activate one 7.5 ohm dynamic brake resistor and absorb up to 45 A and generate a ripple of 5V to the bus voltage. The second level is set from 320V down to 316V and will activate 2 dynamic power resistors of 7.5 ohms in parallel and absorb up to 90 A and generate a ripple of 5V to the bus voltage when shifted up to the second level setting. The third level is set from 325V down to 321V and will activate 3 dynamic brake resistors of 7.5 ohms in parallel, and absorb up to 135 A and generate a ripple of 5V to the bus voltage when shifted up to the third level setting. The fourth level is set from 330V down to 326V and will activate 4 dynamic brake resistors of 7.5 ohms in parallel and absorb up to 180 A and generate a ripple of 5V to the bus voltage when shifted up to the fourth level setting.

It should be appreciated that the dynamic brake resistors 1–d can be switched on and from the system bus 17 in a rotating pattern, as described above, so that each dynamic brake resistors 1–d and its associated switch 31–d will share equally the regenerative load and heat dissipation. Further, the dynamic brake resistors 1–d can be rotated in pairs, depending on the regenerative load placed onto the system bus 17. In other words the dynamic brake resistors 1a and 1b are concurrently connected to the system bus 17, and upon disconnecting them, the dynamic brake resistors 1c and 1d are concurrently connected to the system bus 17. Also, the rotation pattern can be predetermined on the basis of equation 1, which was described above.

Figure 10:
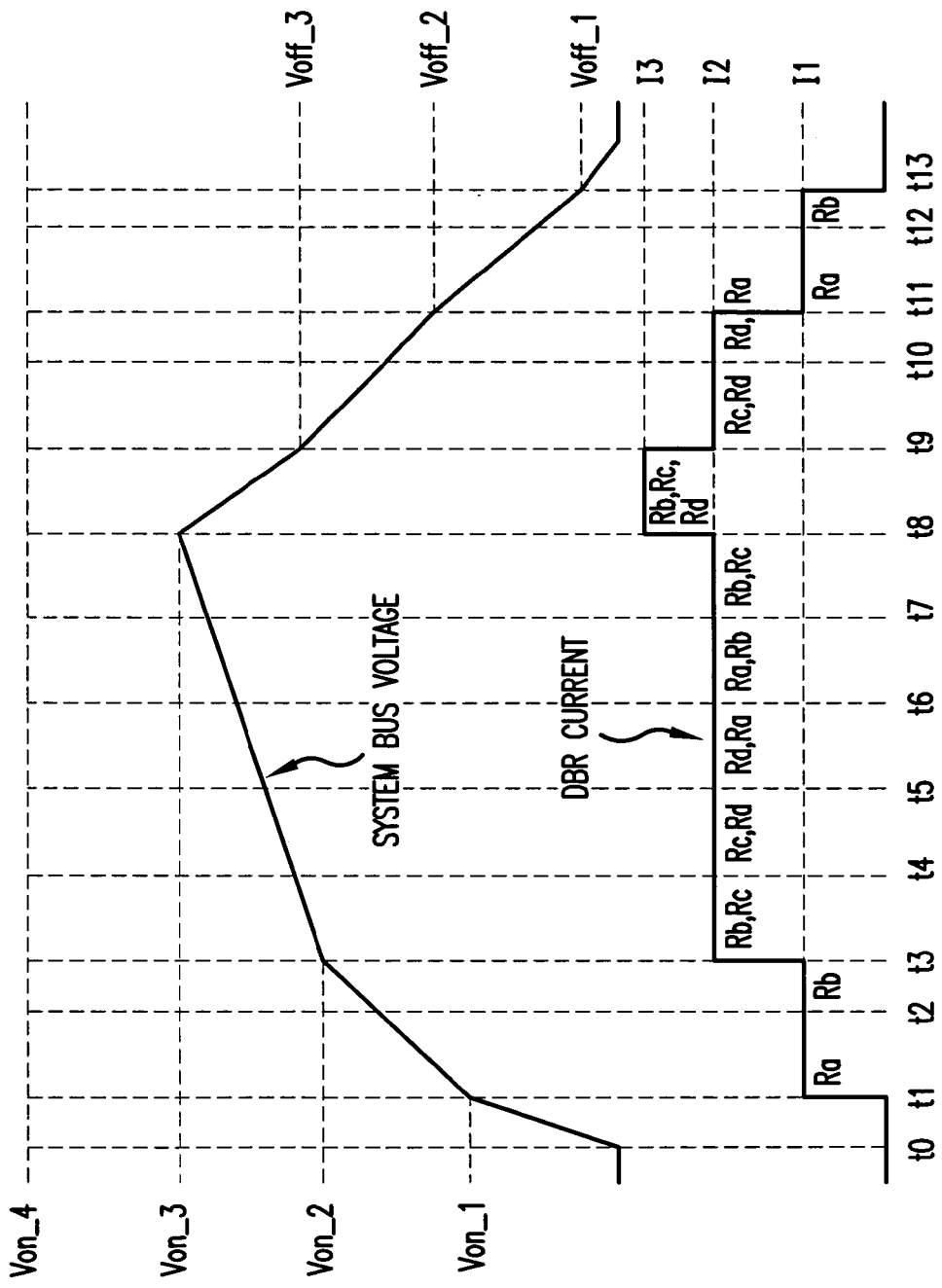
FIG. 10 is a graph depicting a rotation of the dynamic brake resistors, in accordance with an embodiment of the present invention.

FIG. 10 shows an example of the rotation and ramping concept of the dynamic brake resistors 1–d (whose resistances are represented by Ra–d, respectively). As can be seen, depending on the voltage threshold V1–V4, the appropriate combination of dynamic brake resistors 1–d is connected and disconnected from the system bus 17, depending on the regenerative load placed onto the system bus 17. At time t0, the bus voltage starts to rise and reaches V1 at t1. Resistor Ra is switched on and this slows down the voltage rising but the voltage is still climbing. At t2, Ra is rotated to Rb. At t3, the voltage reaches V2 and resistor Rc is switched on and this slows down the voltage rising even further. While the voltage is climbing, the resistors are rotated from Rb & Rc to Rc & Rd, Rd & Ra, and so on. At t8, the third level is reached and hence the third resistor is switched on and the voltage starts to drop. At t9, one resitor (Rb) is switched off and another resistor (Rd) is switched off at t11. At t13, the voltage has returned to lower than the first level V1 and the last resistor (Rb) is switched off.

Furthermore, the dynamic brake resistors 1–d can be selectively rotated depending on their temperatures, which increases due to the dissipation of regenerative energy as heat. In other words, if the dynamic brake resistors are rotated in order as 1a, 1b, 1c, 1d, 1a, etc., and the dynamic brake resistor 1b has a temperature that exceeds a certain threshold, then the order of rotation of the dynamic brake resistors 1–d can be selectively changed such that the next sequence may, for example, be 1a, 1c, 1d, 1a, 1c. When the dynamic brake resistor 1b sufficiently cools, e.g., the temperature lowers, the dynamic brake resistor is then re-inserted into the rotation order. Thereby, the stress on the power components is relieved.

In a further implementation of the present invention, the memory 49 can store temperature data pertaining to the dynamic brake resistors 1–d for the determination of subsequent rotations and for system analysis purposes.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A multi-stage dynamic brake resistor network comprising:
   a plurality of dynamic brake resistors for dissipating regenerative energy inputted onto a system bus;
   a plurality of switches for connecting the dynamic brake resistors to and from the system bus, respectively; and
   a control circuit for controlling the switches such that the dynamic brake resistors are connected to and from the system bus based on a predetermined voltage threshold of the system bus and based on a predetermined rotation pattern.

2. The multi-stage dynamic brake resistor network according to claim 1, wherein the multi-stage dynamic brake resistor network has four dynamic brake resistors and four switches associated with each of the dynamic brake resistors, respectively.

3. The multistage dynamic brake resistor network according to claim 1, wherein the dynamic brake resistors are connected to and from the system bus based on a turn-on rate and a turn-off rate of the dynamic brake resistors.

4. The multi-stage dynamic brake resistor network according to claim 3, wherein the turn-on rate and the turn-off rate of the dynamic brake resistors are controlled such that a substantially constant total resistance of the dynamic brake resistors is maintained during the predetermined rotation pattern.

5. The multi-stage dynamic brake resistor network according to claim 1, wherein the switches are semiconductor switches.

6. The multi-stage dynamic brake resistor network according to claim 1, wherein the multi-stage dynamic brake resistor network further comprises at least one temperature sensor.

7. The multi-stage dynamic brake resistor network according to claim 1, wherein each of the dynamic brake resistors have a temperature sensor associated therewith for monitoring a temperature of their respective dynamic brake resistor.

8. The multi-stage dynamic brake resistor network according to claim 7, wherein each temperature sensor associated with each dynamic brake resistor provides a signal that is compared with a predetermined temperature threshold of the dynamic brake resistor.

9. The multi-stage dynamic brake resistor network according to claim 8, wherein each signal, which is provided from each temperature sensor associated with each dynamic brake resistor, is utilized by the control circuit to connect the dynamic brake resistors to and from the system bus.

10. The multi-stage dynamic brake resistor network according to claim 1, wherein the dynamic brake resistors are arranged in parallel.

11. The multi-stage dynamic brake resistor network according to claim 1, wherein the dynamic brake resistors are connected to and from the system bus so that a substantially constant total resistance of the dynamic brake resistors is maintained during the predetermined rotation pattern.

12. A method of switching a plurality of dynamic brake resistors to and from a system bus, the method comprising:
    detecting a voltage level of the system bus;
    determining if the voltage level of the system bus exceeds a predetermined threshold;
    switching the plurality of dynamic brake resistors to and from the system bus via switches so that the dynamic brake resistors dissipate regenerative energy inputted onto the system bus;
    controlling, by a control circuit, the switches in order to connect the dynamic brake resistors to and from the system bus on the basis of a predetermined voltage threshold of the system bus and on the basis of a predetermined rotation pattern.

13. The method according to claim 12, wherein the predetermined rotation pattern is selected on the basis of a temperature of each of the dynamic brake resistors.

14. The method according to claim 12, wherein the dynamic brake resistors are connected to and from the system bus on the basis of a turn-on rate and a turn-off rate of each of the dynamic brake resistors.

15. The method according to claim 14, wherein the turn-on rate and the turn-off rate of each of the dynamic brake resistors are controlled such that a substantially constant total resistance of the dynamic brake resistors is maintained during the predetermined rotation pattern.

16. The method according to claim 12, wherein the switches are further controlled in order to connect the dynamic brake resistors to and from the system bus on the basis of a monitored temperature provided by a temperature sensor.

17. The method according to claim 12, further comprising the step of monitoring a temperature of at least one of the dynamic brake resistors with at least one temperature sensor being associated with the at least one dynamic brake resistor.

* * * * *